United States Patent [19]
Gilbert et al.

[11] Patent Number: 4,943,368
[45] Date of Patent: Jul. 24, 1990

[54] NONMETALLIC ABRASIVE BLASTING MATERIAL RECOVERY PROCESS INCLUDING AN ELECTROSTATIC SEPARATION STEP

[75] Inventors: Stanley R. Gilbert, Coraopolis; Thomas E. Weyand, Beaver, both of Pa.

[73] Assignee: Pittsburgh Mineral & Environmental Technology, Inc., Monaca, Pa.

[21] Appl. No.: 316,085

[22] Filed: Feb. 27, 1989

Related U.S. Application Data

[63] Continuation-in-part of Ser. No. 271,608, Nov. 15, 1988, abandoned.

[51] Int. Cl.$^5$ .......................... B07B 13/00; B24C 9/00
[52] U.S. Cl. .......................................... 209/2; 51/319; 51/425; 209/12; 209/40; 209/127.1
[58] Field of Search .......................... 209/2, 3, 4, 8, 10, 209/12, 38–40, 127.1, 127.4, 129, 130, 215, 466, 467, 474; 51/319–321, 424–427

[56] References Cited

U.S. PATENT DOCUMENTS

| | | | |
|---|---|---|---|
| 3,322,275 | 5/1967 | Breakiron et al. | 209/127.1 |
| 3,401,795 | 9/1968 | Tauveron | 209/12 |
| 3,460,296 | 8/1969 | Dittmar | 51/320 |
| 3,625,360 | 12/1971 | Schickel | 209/127.4 X |
| 3,865,629 | 2/1975 | Dankoff et al. | 209/3 X |
| 3,970,546 | 7/1976 | Webb et al. | 209/12 X |
| 4,671,867 | 6/1987 | Battie et al. | 209/3 |
| 4,773,189 | 9/1988 | MacMillan et al. | 51/410 X |
| 4,800,063 | 1/1989 | Mierswa et al. | 51/320 |
| 4,827,678 | 5/1989 | MacMillan et al. | 51/320 |

FOREIGN PATENT DOCUMENTS

| | | | |
|---|---|---|---|
| 0206940 | 2/1984 | Fed. Rep. of Germany | 209/12 |
| 46-5515 | 2/1971 | Japan | 209/12 |
| 1370801 | 10/1974 | United Kingdom | 209/474 |

*Primary Examiner*—Margaret A. Focarino
*Assistant Examiner*—Edward M. Wacyra
*Attorney, Agent, or Firm*—Reed, Smith, Shaw & McClay

[57] ABSTRACT

An electrostatic waste separation process for abrasive blasting residues containing an abrasive media and a hazardous material such as lead-based paint. A preconditioning stage as well as a postconditioning stage is used in addition to the electrostatic separation step. Preferably the preconditioning stage consists of the following steps: (a) a size classification step; (b) a ferromagnetic separation step; and (c) a gravity separation step. The concentrated hazardous material separated by this process can then be packaged in a container which can be safely transported, stored or disposed of. The nonhazardous blasting media may be recycled and reused or disposed of as a nonhazardous material.

7 Claims, 2 Drawing Sheets

_NONMETALLIC ABRASIVE BLASTING MATERIAL RECOVERY PROCESS INCLUDING AN ELECTROSTATIC SEPARATION STEP_

REFERENCE TO RELATED APPLICATION

This application is a continuation-in-part of copending U.S. Pat. application Ser. No. 07/271,608, filed on Nov. 15, 1988.

FIELD OF THE INVENTION

The present invention relates to an electrostatic waste separation process. More particularly, it relates to an electrostatic separation process designed to remove or minimize the hazardous waste component of abrasive blasting residues containing lead-based paint.

BACKGROUND OF THE INVENTION

During routine maintenance on various structures such as bridges or buildings, the previous paint coatings are abrasively removed to Provide a secure surface for the new primer and topcoat systems. Typically, abrasive blasting is used once the existing paint coating on a structure has deteriorated beyond repair. In abrasive blasting, a stream of high pressure air is used to carry the abrasive particles to the structure surface at a high speed. The impact of the abrasive with the surface chips off the old paint coatings and cleans the steel surface providing an excellent base for applying the new coating. The spent abrasive particles combined with the paint chips fall to the ground where it traditionally was raked up and either disposed of at the job site or dumped in sanitary landfills.

Recently, a crisis has emerged in the field of abrasive blasting as State and Federal environmental regulators have identified the blasting residue as a potentially hazardous waste due to the lead-based paint used to paint various structures in past years. Estimates vary, but typically 50–75of all residues from tank and structural steel blasting fail the EP (extraction procedure) Leach test used by the U.S. EPA (United States Environmental Protection Agency) as one of the methods to characterize potentially hazardous waste material. Although lead is the most common toxic metal identified in abrasive blasting residues, they may also contain elevated amounts of chromium, arsenic, mercury, and other hazardous materials, possibly in concentrations sufficient to result in an unsatisfactory determination in the EP Leach test.

Two types of problems are associated with the abrasive blasting of paint from structures. First, the spent abrasive particles and the removed paint must be contained during blasting and second, the blasting residue must be disposed of properly. The problem of containment can be achieved by various engineering controls presently available. The present invention helps in accomplishing the problem of disposal.

Currently, hazardous waste disposal is very expensive. Moreover, new regulations are expected which will increase the cost of hazardous waste disposal and encourage efforts to reduce the volume of hazardous waste by treating it prior to disposal to remove as much nonhazardous waste as possible. The reduction in the amount of hazardous waste becomes a paramount consideration as available capacity in approved hazardous waste landfills is rapidly depleted.

Moreover, even when the residue from blasting does not contain hazardous material, it is often desirable to reuse or recycle the paint chips and the abrasive particles for economic savings. However, the recycled abrasive particles lose their effectiveness as the paint content increases. There are various devices that reprocess abrasive residues, generally using a mechanical sizing process. See the article entitled "Current Blasting Technologies", by John Lunardini, at pp. 93–108 of the _Lead Paint Removal Proceedings of the SSPC Symposium_, Vol. SSPC 88-01 (1988) published by the Steel Structures Painting Council. A significant improvement over these devices would be obtained if the paint particles could be separated from the abrasive media. However, the variable nature of the residue materials from different sites which result from differing paint compositions, rust and iron contamination, as well as the varying blasting abrasives used, complicates the physical separation of the abrasive particles from the paint residue and prevents the separation from being economically and feasibly achieved.

It would be technically desirable, as well as economically and environmentally prudent, to have an efficient method of separating the hazardous paint component from the recyclable, reusable, or otherwise safely disposable blasting abrasive media.

SUMMARY OF THE INVENTION

Generally, the present invention provides a waste separation process for physically removing waste materials from the residue of abrasive blasting. The waste treatment process is particularly useful for removing hazardous materials such as lead, in the form of lead-based paint chips from a large volume of residue containing mainly the abrasive blasting media. Generally, the treatment process comprises a preconditioning stage and an electrostatic separation stage. The preconditioning stage can be comprised of several different steps depending upon the amount and type of processing that is necessary to prepare the residue for the electrostatic separation step.

Preferably, the treatment process for the waste abrasive blasting media contaminated with hazardous paint chips consists of several steps which include: (a) size classification; (b) ferromagnetic removal; (c) gravity separation; and (d) electrostatic separation. After separation, the concentrated hazardous material can be packaged into a suitable container within which it can be safely stored or disposed of. Steps (a), (b) and (c) comprise the preconditioning stage and may be performed in any order depending on the specific material being treated to optimize the overall separation process. Moreover, the ferromagnetic separation step and the electrostatic separation step can be combined in one step, but preferably are separate steps. Additionally a postconditioning stage such as packaging can be added to the process after the electrostatic separation if it is necessary or desired to further process the residue depending upon the specific application.

The size classification step may be performed in either a wet or dry state to separate coarse particles from fine particles. Wet processing has the advantage that it controls fugitive dust emissions while dry processing has the advantage of not leaching any of the lead or other hazardous compounds contained in the residue. Various size classification methods may be used such as screening, air cycloning, hydrocycloning, air classifying and so forth. Dry screening is the preferred method due to its efficiency and process flexibility. It also does not require a water treatment step for the removal of dissolved lead. Moreover, multiple stages of screening may be employed to segregate particular size fractions according to their toxic or paint-containing characteristics.

The ferromagnetic removal step preferably provides for the separation of iron bearing magnetic materials which are often attached to lead-based paint particles from the abrasive media. This step may also be performed either wet or dry. Wet processing controls fugitive dust emissions whereas dry processing does not leach any of the hazardous materials. Various ferromagnetic separation methods may be used such as roll or drum separators, belt separators, pulley separators, overhead magnets and so forth. The primary purpose of the ferromagnetic separation step is to remove the tramp iron, ferrous trash, steel particles and ferromagnetic iron oxides removed from the structure during blasting which may have a negative effect if present during the other process steps. This step typically involves the use of low magnetic field strengths because the material removed is highly magnetic.

The gravity separation step provides for particle concentration as a result of the differences in the apparent density of the different materials in the residue, mainly the paint particles and the abrasive media particles. The apparent density is influenced by the specific gravity, shape, texture, and size of the particles. A variety of wet and dry gravity separation methods can be used including, but not limited to, air and wet tabling, air and wet jigging, air and wet separation by elutriation, or settling devices. As mentioned above, the wet methods control dust emissions, but are less efficient for separating the paint particles from the abrasive media than dry processing in most instances. Dry processing methods avoid the leaching of lead as well as the water handling and disposal problems. Dry air tabling is the preferred method because of its separation efficiency, the elimination of potential for lead leaching, and the drying potential it offers when treating damp feed material. At least two products are produced by gravity separation including one product which is more concentrated in residue paint chips and one product which is less concentrated in residue paint chips.

The electrostatic separation step provides for further paint particle concentration based on the differences in the surface electrical conductivity of the residue paint particles and the residue blasting particles. This separation may involve high or low intensity electrostatic field strengths (i.e. 20KV to 50KV) depending on the characteristics of the paint particles and the blasting media, however a high voltage field strength is preferred.

Finally, the hazardous paint particles can be packaged for storage, disposal, or possible further treatment in a postconditioning stage. The amount of paint-rich hazardous material collected will often be only 10-25% by weight of the original amount of waste material.

Other details, objects and advantages of the present invention will become more readily apparent from the following description of a presently preferred embodiment thereof.

BRIEF DESCRIPTION OF THE DRAWING

In the accompanying drawings, a preferred embodiment of the present invention is illustrated, by way of example only, wherein.

DESCRIPTION OF THE PREFERRED EMBODIMENT

Figure 1:
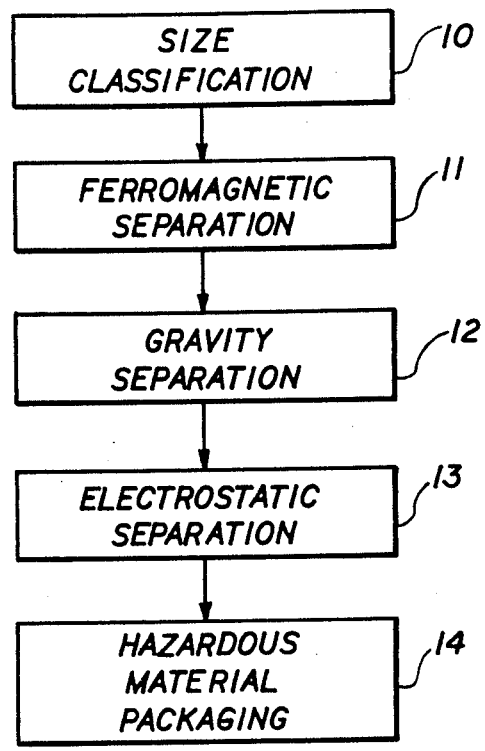
FIG. 1 is a flow chart of a preferred embodiment of the separation process according to the present invention.

The preferred treatment and separation process for residue abrasive blasting material containing lead-based paint comprises the steps shown in FIG. 1, namely: (a) a particle size classification step 10; (b) a ferromagnetic separation step 11; (c) a gravity separation step 12; and (d) an electrostatic separation step 13. Finally, a packaging step 14 can be added for the disposal or storage of the hazardous lead-based paint component separated by the present invention. Additional post-processing or post-conditioning steps can be used instead of or in addition to packaging step 14. Preferably, the preprocessing or preconditioning stage comprises particle size classification step 10, ferromagnetic separation step 11 and gravity separation step 12. Other preprocessing steps can also be used. Moreover while the preferred order of steps 10-12 is shown in FIG. 1, these steps can be performed in different orders.

Figure 2:
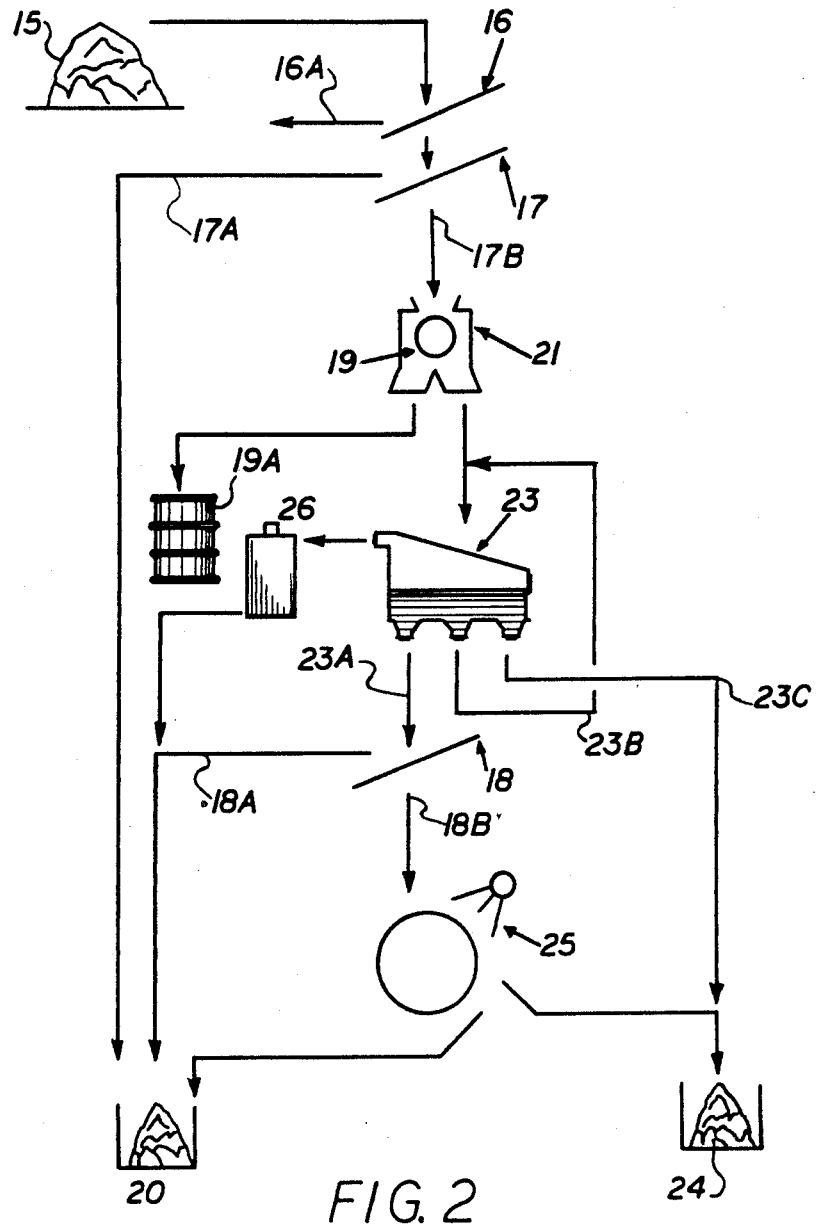
FIG. 2 is a schematic diagram of the separation process shown in FIG. 1.

In the preferred embodiment shown in FIG. 2, a dry abrasive blasting residue 15 consisting of an abrasive media, such as slag, sand, garnet, steel shot etc., and paint chips removed from a steel structure such as bridges, tanks, ships, vehicles, buildings, etc. is conveyed to a feed hopper (not shown) which regulates the flow of the residue 15 to the size classification step 10. The conveying method may be shoveling, mechanical conveying, air eduction or any of a variety of other conveying methods.

The size classification step 10 preferably consists of separating the feed mixture into 3 screen fractions by proper selection of 2 sizes of sieves. Typically, a ¼ inch sieve 16 and a 9 mesh (U.S. #10) sieve 17 are used to produce 3 screen fractions, namely +¼ inch, −¼ inch to +9 mesh, and −9 mesh. The specific weight distribution of material in the screen fractions may vary depending on the size of the sieves used and the feed material as will become apparent from the following discussion. The first screen fraction 16A (+¼inch) is the coarse material which consists primarily of trash, gravel, stones, branches etc. picked up with the residue. This material 16A is primarily nonhazardous waste and represents only a small fraction of the residue 15. The second screen fraction 17A (−¼inch to +9 mesh) consists mainly of the coarse paint particles in the residue 15. Screen 17 is selected to pass essentially all of the abrasive media 17B while the coarse paint particles 17A are discharged to the hazardous material storage container 20. The third screen fraction 17B (−9 mesh) is independently conveyed by chutes, air eduction or conveyers (vibrating, screw, belt etc.) for further processing.

The ferromagnetic separation 11 is performed by a magnetic separator 21 and involves passing third screen fraction 17B over a comparatively low intensity magnet to extract the ferrous objects such as wire, magnetic iron oxides, steel filings, etc. One way of doing this is to place a magnetic drum 19 discharging to gravity separator 23. The magnetic drum 19 redirects the ferromagnetic material to an alternate container 19A for disposal. Depending on the character of the feed material, this product may or may not be hazardous depending on whether the ferromagnetic rust and or steel that is extracted is contaminated with paint containing lead. This step may be performed before or after the size classification step 10 but preferably is performed prior to the gravity separation step 12, i.e. after the residue has been conveyed to separator 23 but before it is passed throuqh screen 18.

The gravity separation step 12 may be performed on unclassified feeds. In this mode, the gravity concentration tends to classify the feed into large heavy particles of abrasive suitable for reuse and a paint concentrate mixed with fine abrasives. A middlings product is recirculated in the process. Classified feeds will improve the separations achieved, but at generally increased cost and lower throughput.

The air table gravity separator 23 produces three products; an intermediate paint concentrate 23A, a middling product 23B (mixture of paint and abrasive) and an abrasive product 23C. The abrasive product 23C is essentially free of paint chips and can be discharged to the nonhazardous stockpile 24 or a separate container. The middling product 23B representing up to 300% of the new feed material flow to the air table is continuously recirculated to the gravity separator 23 for reprocessing. The intermediate paint concentrate 23A is discharged and conveyed to the electrostatic separation step 13. The intermediate paint concentrate 23A contains a significant amount of abrasive media. Although this material may pass the EP Leach test as a nonhazardous material, it is desirable to further concentrate this stream to achieve the maximum recovery of the abrasive media for reuse. The gravity separation step 12 tends to classify material by coarse heavy material (large abrasive particles) and fine light material (paint flakes and fine abrasive). An optional screen 18 will remove the larger paint particles 18A while passing the fine abrasive and paint particles 18B to the electrostatic separation step 13.

In the case of many materials used for abrasive blasting the blasting media is weakly conductive in an electrostatic separator 25 while the paint fraction that is not contaminated with rust, iron compounds, etc., is nonconductive. The electrostatic separation step 13 separates and discharges the nonconductive paint to the hazardous material collector 20 while directing the blasting media to the nonhazardous stockpile 24. Generally, a two stage electrostatic separation is used to achieve the desired volume and weight reduction levels although a single stage separator may b ⓡsufficient.

In all cases where the materials are being processed dry, dust collection is necessary due to the toxic paint particles present in the fine dust. The fine airborne paint particles may contain a significant amount of lead and are collected by a dust collector 26 and discharged to the hazardous materials container 20.

The following is a description of an example of the process of the present invention as actually used on a batch of abrasive blasting material contaminated with lead bearing paint chips. The residue consisted of coal slag abrasive particles and paint chips consisting of lead-based primer with a topcoat paint. The coal slag particles consisted of a glassy aluminosilicate slag containing approximately 8% iron in the slag. The paint chips consisted of multiple layers of paint including a lead base primer and various top coat layers. These paint chips contained lead, zinc, aluminum, silicon, magnesium, calcium, zirconium, and various other trace elements in the pigment and filler systems used. The bulk analysis of the residue showed that lead was the principle heavy metal contaminant at approximately 0.3% concentration. This sample yielded a lead extraction of 9 ppm lead on the EP Leach test (5ppm or greater is considered to be hazardous material). The bulk density of the material was approximately 95 pounds per cubic foot. The initial dry weight was 6.6 Kg.

The sample was thoroughly blended and screened at ¼ inch. The +¼ inch material consisted of various trash items such as gravel, stones, branches, matchbooks, etc., raked up with the residue. The trash amounted to 33 grams (0.5% of the original sample weight). The −¼ inch material was screened using a 9 mesh screen. The −¼ inch to +9 mesh material consisted of essentially of paint with some abrasive and fine gravel. This material weighed 46.6 grams (0.7% of the original sample weight). This material is clearly hazardous waste due to the paint concentration. Typically this material contains 3–10% lead. The −9 mesh material was passed over a low intensity magnet which removed 286.4 grams of rust and steel (4.3% of the original sample weight).

The nonmagnetic material was passed over a 1.7 square foot deck air separator table. This dry gravity table provided particle separation by fluidization, i.e. by stratification of dry granular particles in a rising current of air. The separation was made on a porous deck surface of fabric or perforated metal. The heavier particles sunk to the bottom of the fluidized bed. A straight line vibrating motion imparted to the deck carried these heavier particles away from the lighter particles which floated in the air stream. The deck was sloped in two directions, from feed to discharge and from light end to heavy end. The heaviest particles were conveyed up the slope and forced off the deck at its upper side. The abrasive particles in the residue migrated to the "heavy" side of the air separator table while the paint chips migrated to the "light" side of the table discharge. The middlings product consisting of a mixture of paint and abrasive particles were recirculated to the table feed. Approximately 150% of the table feed was recirculated comprised of material. For this example, table production rates were approximately 375 pounds per hour of combined abrasive and paint products. The abrasive product from the air table was a final product consisting of 2.5 Kg. (37.3% of the original weight) reporting less than 1 ppm lead on the EP Leach test.

The light material was conveyed to a two stage electrostatic separator. The electrostatic unit consists of a 10 inch diameter drum with approximately 6 inches of working width. A corona electrode was positioned approximately 2 inches from the surface of the drum and approximately 30 degrees rotation beyond the point where feed material was introduced onto the drum. The feed rate, drum speed, and corona electrode positions can be varied and the values used depend on the characteristics of the feed material. In this example, the DC voltage between the drum and the corona electrode was 35 KV, the drum speed was 45 RPM, and the feed rate was 15.9 Kg of drum width.

Three products were produced in the first stage of the electrostatic separator. A nonconductor consisting essentially of paint weighing 73.3 grams (1.1% of the initial feed weight) and a middlings product consisting of a mixture of paint and abrasive weighing 819 grams (12.2% of initial feed weight) and a conductive product consisting of essentially fine abrasive material and a small amount of paint. The conductive product from stage 1 was passed over a second electrostatic separator yielding a nonconductive paint product of 33.3 grams (0.5% of the initial feed weight), a middling product weighing 619.4 grams (9.2% of the initial feed weight) and a conductive abrasive product weighing 2.28 Kg. (34.2% of the original feed weight). This material reported 1.7 ppm lead on the EP Leach test.

Therefore, in this example, of the original hazardous material, 72% was recovered as nonhazardous material suitable for reuse. The hazardous materials constitute 28% of the original material. Commercially, the paint bearinq products would be properly packaged and disposed of in an approved landfill for hazardous wastes and the abrasive media would either be recycled and reused or disposed of in an approved landfill.

While a presently preferred embodiment of practicing the invention has been shown and described with the accompanying drawings, the invention may otherwise be embodied within the scope of the following claims.

What is claimed is:

1. A dry abrasive blasting residue separation process wherein a nonmetallic abrasive blasting material is separated from the blasting residue comprising:
   (a) a size classification step to eliminate large objects form the abrasive blasting residue and to concentrate the residue for further processing;
   (b) a ferromagnetic separation step to remove ferrous objects from the blasting residue which would interfere with further processing of it;
   (c) a gravity separation step to reclaim large particles of the nonmetallic abrasive blasting material from the blasting residue and to concentrate the fine blasting residue containing fine particles of the nonmetallic abrasive blasting material and nonconducting paint particles; and
   (d) an electrostatic separation step to reclaim the fine particles of the nonmetallic abrasive blasting material and separate it from the fine nonconducting paint particles.

2. The separation process as described in claim 1 wherein the electrostatic separation step is accomplished using a two stage electrostatic separation.

3. The separation process as described in claim 1 wherein the nonmetallic abrasive blasting material is selected from the group consisting of sand, slag and garnet.

4. The separation process as described in claim 1 wherein the paint particles contain lead.

5. The separation process as described in claim 1 wherein the size classification step separates the blasting residue into three screen fractions.

6. The separation process as described in claim 1 wherein the ferromagnetic separation step utilizes low intensity magnetic fields.

7. The separation process as described in claim 1 wherein the gravity separation step is accomplished using an air table.

* * * * *